United States Patent Office 3,516,989
Patented June 23, 1970

3,516,989
**INTERMEDIATES FOR TOTAL SYNTHESIS OF *IBOGA* ALKALOIDS AND MEANS OF PREPARATION**
Stephen I. Sallay, Wynnewood, Pa., assignor to American Home Products Corporation, New York, N.Y., a corporation of Delaware
No Drawing. Filed Oct. 2, 1967, Ser. No. 671,966
Int. Cl. C07d 41/04, 41/06, 41/08
U.S. Cl. 260—239                                                 18 Claims

ABSTRACT OF THE DISCLOSURE

This invention is concerned with new and novel derivatives of *iboga* alkaloids which are pharmacologically efficacious as central nervous system stimulants. Further, this invention relates to new and novel intermediates for the preparation of *iboga* alkaloids and their new and novel derivatives by a totally synthetic, commercially applicable process.

---

This invention relates to a new and novel synthetic procedure for the preparation of certain naturally occurring iboga alkaloids, related novel *iboga* derivatives and intermediates.

The structure of *iboga* alkaloids, e.g. ibogamine and ibogaine, was first elucidated by Dickel et al. in J. A. C. S., 80, 123 (1958). The first model study of the synthesis of *iboga* alkaloids was described by S. I. Sallay in Tetrahedron Letters, 36,2443 (1964) and U.S. 3,294,817, entitled "Octahydroindolobenzazepines and Compounds Intermediate Thereto" which issued on Dec. 27, 1966. The first total synthesis of iboga alkaloids was achieved by Büchi et al. as described in J.A.C.S. 87, 2073 (1965) and J.A.C.S. 88, 3099 (1966). However, the advantages of the herein described process are: the excellent yields which are obtained in every step; the reactions are stereoselective thus providing isomer-free intermediates and products; there are no undesired rearrangements during the synthesis; and the indole ring closure as the last step of the synthesis provides great versatility in the preparation of synthetic *iboga* alkaloid derivatives

SUMMARY OF THE INVENTION

The present invention relates to new and novel derivatives of iboga alkaloids which have been found to be pharmacodynamically active as central nervous system stimulants. These new and novel compounds are represented by the following formula:

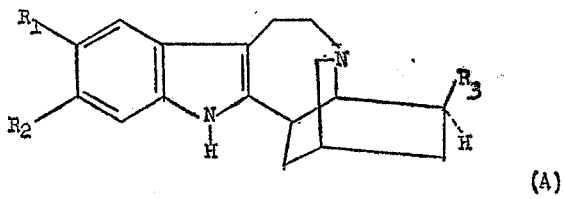

(A)

Further, the present invention relates to new and novel intermediates which are represented by the following formulae:

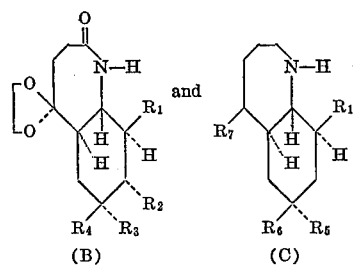

wherein $R_1$ is lower alkyl; $R_2$ when taken separately is hydrogen; $R_3$ when taken separately is selected from the group consisting of hydrogen and hydroxy; and when $R_2$ and $R_3$ are taken together form an epoxy group; $R_4$ when taken separately is selected from the group consisting of hydrogen and hydroxymethyl and when $R_3$ and $R_4$ are taken together with the carbon atom to which they are attached form a moiety selected from the group consisting of ethylidene and carbonyl; $R_5$ when taken separately is hydrogen; $R_6$ is selected from the group consisting of hydroxymethyl and tosyloxymethyl and when $R_5$ and $R_6$ are taken together with the carbon atom to which they are attached form an ethylidene group; $R_7$ when taken together with the carbon atom to which it is attached is selected from the group consisting of carbonyl and a 1,3-dioxane; $R_8$ is selected from the group consisting of hydrogen, trifluoroacetyl and carbobenzoxy with the proviso that when $R_7$ is carbonyl $R_5$ and $R_8$ are hydrogen and $R_6$ is tosyloxymethyl and with the further proviso that when $R_6$ and $R_5$ are taken together $R_8$ is selected from the group consisting of hydrogen and trifluoroacetyl.

Still further, the present invention relates to other new and novel intermediates which are depicted by the following formula:

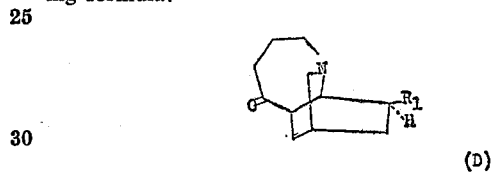

(D)

wherein $R_1$ is lower alkyl.

The term lower alkyl as employed in the definition of the four aforesaid structural Formulae A, B, C and D is meant to include those alkyl moieties which contain from one to about six carbon atoms.

The *iboga* alkaloids and the new and novel derivatives and intermediates of the present invention are prepared by the sequence of reactions which comprises six phases as hereinafter illustrated.

Phase A

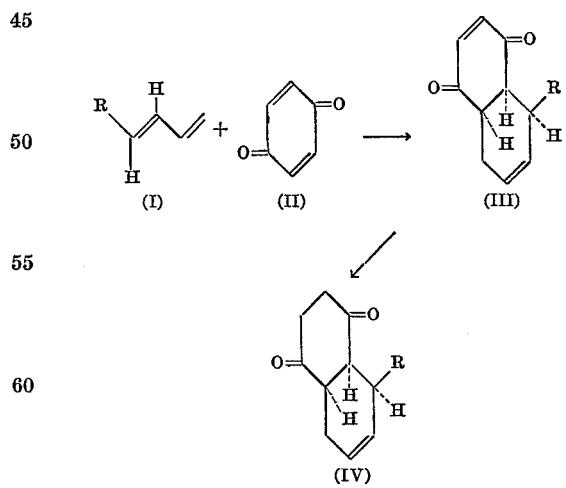

where R is defined as lower alkyl.

Phase A comprises reacting a trans-alkyl-1,3-diene (I) and p-benzoquinone (II) to form a Diels-Alder adduct designated as a 5β-alkyl-4a,5,8a-tetrahydro-1,4-naphthoquine (III) which is then selectively reduced to a cis-fused enedione, named as a 5β-alkyl-2,3,4a,5,8,8a-hexahydro-1,4-naphthoquinone (IV).

Phase B

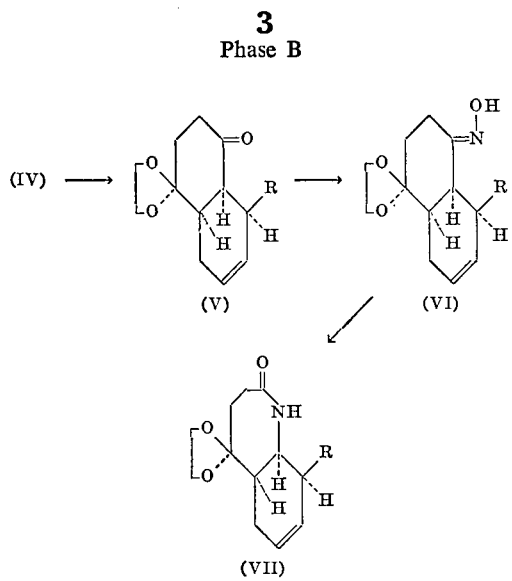

Phase B involves the monoketalization of the 1-position carbonyl moiety of the above prepared cis-fused enedione (IV) to afford a monoketal, named as a 5′β-alkyl-2′,3′,-4′a,5′,8′,8′a-hexahydrospiro [1,3 - dioxolane - 2,1′(4′H)-naphthalen]-4′-one (V); which is then converted to the corresponding ketaloxime, decribed as a 5′β-alkyl-2′,3′,-4′a,5′,8′,8′a-hexahydrospiro[1,3 - dioxolane-2,1′-(4′H)-naphthalen]-4′-one, oxime (VI); which is finally subjected to a Beckmann rearrangement to form a seven-membered lactamketal designated as a 9β-alkyl-3,4,5a,6,-9,9a - hexahydrospiro[5H-1-benzazepino-5,2′-(1,3)diox-olan]-2(1H)-one (VII).

The reactants and the reactions of Phases A and B are more completely described in U.S. 3,294,817, entitled "Octahydroindolobenzazepines and Compounds Intermediate Thereto," which issued on Dec. 27, 1966 to Stephen I. Sallay.

Phase C

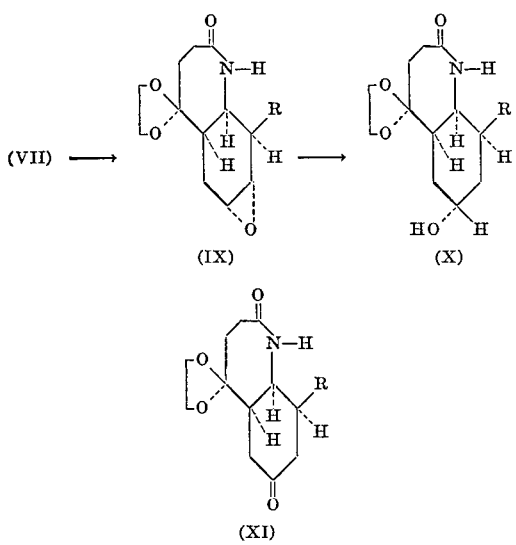

Phase C comprises the α-epoxidation of the 7,8-position of the above-prepared seven-membered lactamketal to form the corresponding epoxylactam, named as a 7α,7α-epoxy - 9β - alkyl-3,4,5a,6,7,8,9,9a-octahydrospiro[5H-1-benzazepino-5,2′(1,3)dioxolan]-2(1H)-one (IX); which is stereoselectively reduced to an appropriate hydroxylactam, described as a 9β-alkyl-3,4,5a,6,7,8,9,9a-octahydro-7α - hydroxyspiro[5H-1-benzazepino-5,2′-(1,3)-dioxolan]-2(1H)-one (X), which is then oxidized to form a lactamketone, called a 9β-alkyl-3,4,5a,6,9,9a-hexahydrospiro [5H - 1 - benzazepino-5,2′-(1,3)dioxolane]-2,7(1H,8H)-dione (XI).

The new and novel selective reduction described in Phase C is conducted by contacting an appropriate epoxylactam (IX) with lithium aluminum hydride in a reaction-inert organic solvent at reflux temperatures for a period of about three to about twelve hours.

When the selective reduction is complete, the resulting hydroxylactam (X) is separated by standard recovery procedures, such as filtration and recrystallization from a suitable solvent, e.g. an ethyl acetate-alkanol mixture. As employed in this process by the term reaction-inert organic solvent is meant an organic liquid which will dissolve the reactants and not interfere with their interaction. Many such solvent will readily suggest themselves to those skilled in the art of chemistry, for example, ether and tetrahydrofuran.

Phase D¹

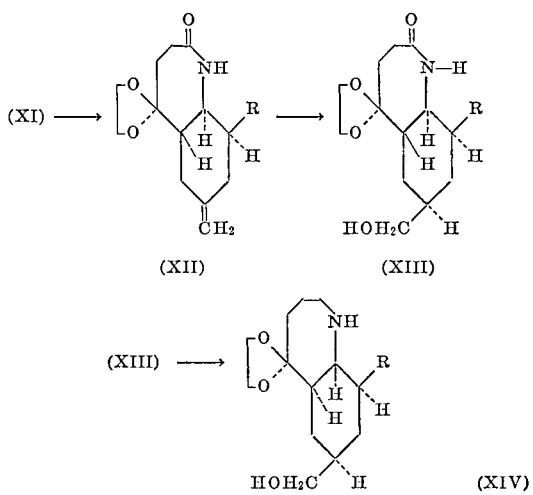

Phase D¹ comprises subjecting the above-prepared lactamketone (XI) to the Wittig reaction to form an exomethylene lactamketal, named as a dl-cis-9-alkyloctahydro-7-methylenespiro-[5H - 1 - benzazepin-5,2′-(1,3)-dioxolan]-2(1H)-one (XII); which is selectively reduced by hydroboration to a hydroxymethyl lactam, described as a dl-cis-9-alkyloctahydro-7-hydroxymethylspiro-[5H-1-benzazepine-5,2′-(1,3)-dioxolan]-2-one (XIII); which is then reduced with lithium aluminum hydride to an aminoalcohol, named as a dl-cis-9-alkyldecahydrospiro-[5H-1-benzazepine-5,2′-(1,3)dioxolane]-7-methanol (XIV).

The new and novel reductive hydroboration described in Phase D¹ is conducted by contacting an appropriate exomethylene lactamketal (XII) with about one molar equivalent of diborane in a non-reactive organic solvent at a temperature range from about 0° C. to about 25° C. for a period of about one to about sixteen hours. Thereafter, the borane intermediate is oxidized by the addition of an alkali metal hydroxide and a peroxide. Preferably this reaction is conducted in tetrahydrofuran, the alkali metal hydroxide employed is sodium hydroxide, and the peroxide which is utilized is hydrogen peroxide.

When the above-reaction is complete, the excess peroxide is decomposed by the addition of a palladium-carbon catalyst and the resulting hydroxymethyl lactam (XIII) is separated by conventional recovery procedures. By the term "non-reactive organic solvent" as employed in this process is meant an organic solvent which will not destroy diborane, e.g. tetrahydrofuran, ether and dioxane.

Phase D²

(XI) ⟶

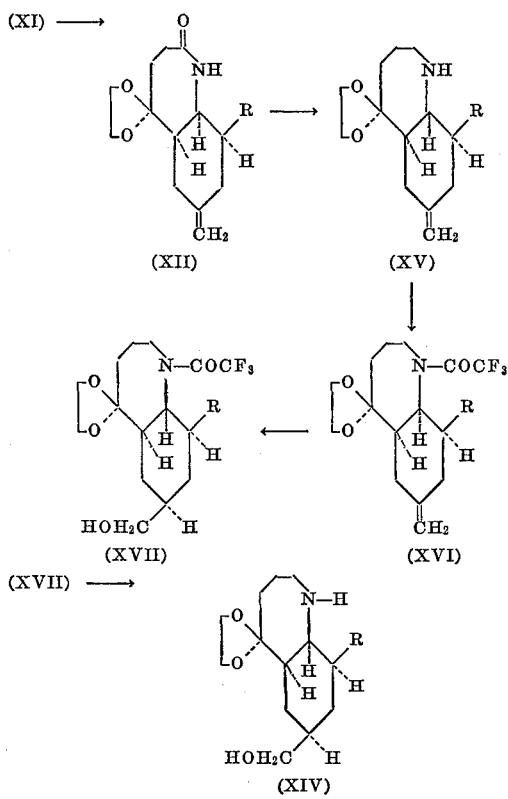

Phase D² is an alternate sequence of reaction for the preparation of aminoalcohols (XIV) from their appropriate lactamketone (XI). In this sequence of reaction designated as Phase D², the lactamketone (XI) is again subjected to the Wittig reaction to form the exomethylene lactamketal (XII); which is reduced with lithium aluminum hydride to form an exomethyleneamine, named as a dl-cis-9-alkyldecahydro-7-methylenespiro-[5H-1-benzazepine - 5,2' - (1,3)dioxolane] (XV); which is treated with trifluoroaceticanhydride to form the exomethylene trifluoroacetamide, designated as a dl-cis-9-alkyldecahydro-7-methylene - 1 - trifluoroacetylspiro[5H-1-benzazepine-5,2'(1,3)dioxolane] (XVI); which is subjected to hydroboration to produce a hydroxymethyltrifluoroacetamide, described as dl-cis-9-alkyldecahydro-1-trifluoroacetylspiro-[5H-1-benzazepine - 5,2' - (1,3)dioxolane]-7-methanol (XVII); which is then hydrolyzed to form the previously described aminoalcohol (XIV).

Phase E (XIV) ⟶

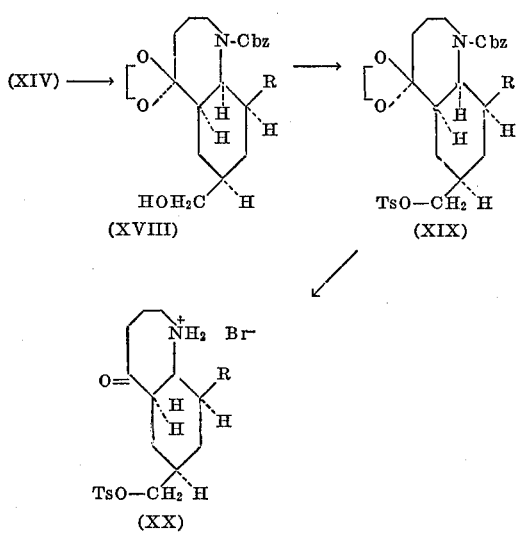

Phase E comprises the carbobenzoxylation of an aminoalcohol (XIV) to form a corresponding N-carbobenzoxy alcohol, named as a dl-cis-9-alkyloctahydro-7-hydroxymethylspiro-[5H-1-benzazepine - 5,2' - (1,3)dioxolane]-1-(2H)-carboxylic acid, benzyl ester (XVIII); which is reacted with tosyl chloride to form a N-carbobenzoxy toluenesulfonate, described as a dl-cis-9-alkyloctahydro-7-hydroxymethylspiro-[5H-1-benzazepine - 5,2' - (1,3-dioxolane]-1-(2H)-carboxylic acid, benzyl ester, p-toluenesulfonate (XIX), which is then reacted with hydrogen bromide to afford a tosyloxyaminoketone, designated as a dl-cis-9-alkyldecahydro-7-hydroxymethyl-5H-benzazepine-5-one, p-toluenesulfonate, hydrobromide (XX).

Phase F (XX) ⟶

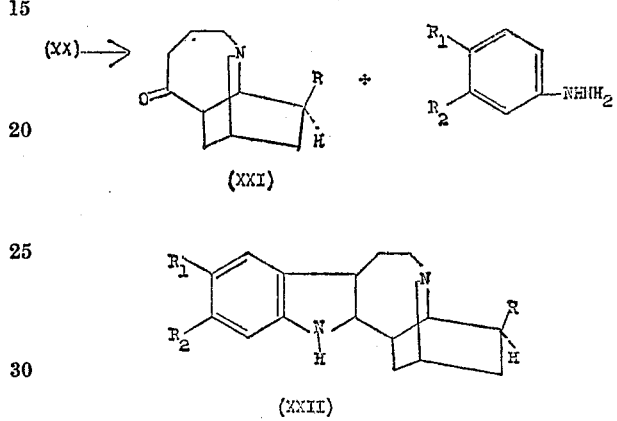

wherein both $R_1$ and $R_2$ are selected from the group consisting of hydrogen, hydroxy, lower alkoxy, amino, lower alkylamino, di(lower)alkylamino, benzylamino, halogen, cyano and carboxy.

Phase F relates to the cyclization of the above-prepared tosyloxyaminoketone (XX) to afford an isoquinuclidinone, named as a dl-cis-9-alkyloctahydro-1,7-methano-1H-1-benzazepin-5-(4H)-one (XXI); which is then condensed with an appropriate phenylhydrazine to produce the desired iboga alkaloid or derivative (XXII) thereof.

The trans-alkyl-1,3-diene starting materials employed in the above-described process are prepared by the procedure described by Alder et al. in Ann., 571, 139 (1951). Other materials employed in the processes herein described are commercially available or are easily prepared by procedures well known to those skilled in the chemical art.

The new and novel compounds of the present invention which are represented by hereinbefore list structural Formula B, C and D are useful as intermediates in the preparation of naturaly occurring *iboga* alkaloids and their derivatives of the present invention. It is well known in the pharmocological art as described by A. Zetler in Arzneimittel Forch., 14, 1277 (1964) that the naturally occuring *iboga* alkaloids, which include ibogamine, ibogaine, Tabernanthine and ibogaline, are central nervous system stimulants.

The new and novel *iboga* alkaloid derivatives (A) of the present invention have been found to possess interesting pharmaceutical properties which render them useful as synthetic medicinals. More particuuarly, these compounds in standard pharmacological tests have exhibited utility as central nervous system stimulants useful in the treatment of depression, fatigue and narcolepsy.

When the new and novel *iboga* alkaloid derivatives (A) compounds of this invention are employed as central nervous system stimulants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may also be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the *iboga* alkaloid derivatives of this invention will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 5 mg. to about 30 mg. per kg. of body weight per day, although as aforementioned variations will occur.

EXAMPLE I

A solution of 194 g. of the trans-hexadiene-1,3 in 2500 ml. of benzene is treated with 268 g. of p-quinone and gently refluxed for two hours. The reaction mixture is then evaporated to dryness under vacuum. A dark colored syrup is obtained, which is purified by recrystallization from hexane to afford dl-cis-5β-ethyl-4a,5,8,8a-tetrahydro-1,4-naphthoquinone, M.P. 46–48° C.

*Analysis.*—Calcd. for $C_{12}H_{14}O_2$ (percent): C, 75.76; H, 7.42. Found (percent): C, 75.53; H, 7.19.

Similarly dl-cis-4a-5,8,8a-tetrahydro - 5β - methyl - 1,4-naphthoquinone and dl-cis-4a,5,8,8a-tetrahydro-5β-propyl-1,4-naphthoquinone are produced.

EXAMPLE II

The crude dl-cis-5β-ethyl-4a,5,8,8a-tetrahydro-1,4-naphthoquinone of Example I is dissolved in 2500 ml. of acetic acid and reduced with 720 g. zinc powder for one hour at 50° C. After the addition, the reaction mixture is stirred for another hour, diluted with 1000 ml. of acetone and filtered. The filtrate is concentrated to about 1000 ml. and poured onto 25 l. of ice water. In this way, there is obtained dl - cis - 5β - ethyl - 2,3,4a,5,8,8a-hexahydro-1,4-naphthoquinone (306 g.), M.P. 71–73° C.

*Analysis.*—Calcd. for $C_{12}H_{16}O_2$ (percent): C, 74.97; H, 8.39. Found (percent): C, 75.03; H, 8.23.

In the same manner, dl-cis-4a,5,8,8a-tetrahydro-5β-methyl-1,4-naphthoquinone is converted to dl-cis-2,3,4a,5,8,8a-hexahydro-5β-methyl-1,4-naphthoquinone and dl-cis-4a,5,8,8a-tetrahydro-5β-propyl-1,4-naphthoquinone is also converted to dl-cis-2,3,4a,5,8,8a-hexahydro-5β-propyl-1,3-naphthoquinone.

EXAMPLE III

To a solution of 247 g. of dl-cis-5β-ethyl-2,3,4a,5,8,8a-hexahydro-1,4-naphthoquinone prepared in Example II in 500 ml. of dichloromethane and 600 ml. of acetic acid, there is added at about 0° C. within one hour 88 g. of ethyleneglycol in 360 ml. of acetic acid and 186 g. borontrifluoroetherate in 250 ml. of acetic acid. The reaction mixture is poured into 2 liters of water and extracted with petroleum ether. The combined extracts are then washed with water and sodium bicarbonate and then evaporated to an almost colorless, oily product which is distilled at 104°/0.01 mm. to afford dl-cis-5'β-ethyl-2',3',4'a,5',8',8'a-hexahydrospiro[1,3 - dioxolane-2,1'(4'H)naphthalen]-4'-one.

In the same way, starting with an appropriate compound, as prepared in Example II, dl-cis-2',3',4'a,5',8',8'a-hexahydrospiro - 5'β - methyl - [1,3 - dioxolane - 2,1' (4'H)naphthalen]-4'-one and dl-cis-2',3',4'a,5',8',8'a-hexahydrospiro - 5'β - propyl - [1,3 - dioxolane - 2,1' - (4H) naphthalen]-4'-one are prepared.

EXAMPLE IV

The crude dl-cis-5'β-ethyl-2',3',4'a,5',8',8'a-hexahydrospiro[1,3 - dioxolane - 2,1'(4'H)naphthalen] - 4' - one of Example III is admixed with one mole equivalent of hydroxylamine acetate in 1200 ml. of methanol (prepared from 102 g. of hydroxylamine HCl and 118 g. sodium acetate). The reaction mixture is heated to 60° C. and then allowed to stand for a few hours. The crystals which separate are collected to afford dl-cis-5'β-ethyl-2',3',4'a,5', 8',8'a - hexahydrospiro[1,3 - dioxolane - 2,1'(4'H) - 4'-one, oxime, 260 g., M.P. 125–126° C., I.R. spectrum possesses bands at 3.1μ (OH), 2.97μ(C=N), 6.05μ (C=C) and 11.0μ (ketal).

*Analysis.*—Calcd. for $C_{14}H_{21}O_3N$ (percent): C, 66.90; H, 8.42; N, 5.57. Found (percent); C, 66.94; H, 8.39; N, 5.44.

Similarly, by employing the appropriate starting compounds the following compounds are prepared:

dl-cis-2',3',4'a,5',8',8'a-hexahydrospiro-5'β-methyl-
  [1,3-dioxolane-2,1'(4'H)-4'-one, oxime; and
dl-cis-2',3',4'a,5',8',8'a-hexahydrospiro-5'β-propyl-
  [1,3-dioxolane-2,1'(4'H)-4'-one, oxime.

EXAMPLE V

One hundred grams of the dl-cis-5'β-ethyl-2',3',4'a,5', 8',8'a - hexahydrospiro - [1,3-dioxolane - 2,1'(4'H) - 4'-one, oxime of Example IV, is dissolved in 600 ml. of pyridine and treated with 76 g. of p-tosylchloride. An exothermic reaction takes place and the temperature rises to about 75° C. The reaction mixture is slowly cooled to room temperature and then evaporated to dryness. The dark residue is dissolved in chloroform and washed to neutral with cold diluted hydrochloric acid and water. The dried chloroform solution is evaporate to a red gum which is triturated with a mixture of hexane-ethyl acetate. A light colored solid (83.8 g.) is obtained which is recrystallized from ethyl acetate to afford dl-cis-9β-ethyl-3,4,5a, 6,9,9a - hexahydrospiro[5H - 1 - benzazepino - 5,2' - (1,3) dioxolan]-2(1H)-one M.P. 144–145° C. I.R. spectrum exhibited bands at 3.17μ (NH), 6.05μ (lactam).

*Analysis.*—Calcd. for $C_{14}H_{21}O_3N$ (percent); C, 66.90; H, 8.42; N, 5.57. Found (percent); C, 67.14; H, 8.54; N, 5.54.

In the same manner, reacting an appropriate ketaloxime, as prepared in Example IV, there is obtained dl-cis-3,4,5a, 6,9,9a - hexahydrospiro - 9β - methyl - [5H - 1 - benzazepino - 5,2' - [1,3]dioxolan] - 2(1H) - one and dl - cis-3,4,5a,6,9,9a - hexahydrospiro - 9β - propyl - [5H - 1-benzazepino-5,2'-[1,3]dioxolan]-2(1H)-one.

EXAMPLE VI

Fifty grams of the dl-cis-9β-ethyl-3,4,5a,6,9,9a-hexahydrospiro - [5H - 1 - benzazepino - 5,2' -[1,3]dioxolan]-2(1H)-one prepared in Example V is dissolved in 500 ml. of chloroform, treated with 0.2 mole of m-chloroperbenzoic acid dissolved in 500 ml. chloroform at about room temperature. After the peracid is consumed, the reaction mixture is extracted with diluted alkali. Upon the removal of the solvent under vacuum there is obtained as a colorless crystal dl-cis-7α,8α-epoxy-9β-ethyl-3,4,5a,6,7, 8,9,9a - octahydrospiro[5H - 1 - benzazepino - 5,2' - [1,3], M.P. 170–171° C. I.R. exhibited the strong bond at 6.04μ for the lactam group.

*Analysis.*—Calcd for $C_{14}H_{21}O_4N$ (percent): C, 62.90; H, 7.92; N, 5.24. Found (percent); C, 62.99; H, 7.99; N, 5.31.

Employing the above procedure, dl-cis-7α,8α-epoxy-3,4,5a,6,7,8,9,9a - octahydrospiro - 9β - methyl - [5H - 1-benzazepino - 5,2' - [1,3] - dioxolan] - 2(1H) - one and dl - cis - 7α,8α - epoxy - 3,4,5a,6,7,8,9,9a - octahydrospiro - 9β - propyl - [5H - 1 - benzepino - 5,2' - [1,3]-dioxolan]-2(1H)-one are prepared.

EXAMPLE VII 2.67 g. (0.01 mole) of the dl-cis-7α,8α-epoxy-9β-ethyl-3,4,5a,6,7,8,9,9a - octahydro[5H-1-benzazepino-5,2'-[1,3]-dioxolan]-2(1H)-one of Example VI is dissolved in 100 ml. of ether and added to 0.4 g. (0.01 mole) of lithium aluminum hydride dissolved in 50 ml. of the same solvent. The reaction mixture is refluxed for five hours, cooled and carefully decomposed. The resulting colorless crystalline hydroxylactam, 2.4 g. which melts at 176–178° C. is recrystallized from ethyl acetate:ethanol to afford dl-cis-9β-ethyl - 3,4,5a,6,7,8,9,9a-octahydro - 7α-hydroxyspiro[5H-1-benzazepino-5,2'-(1,3)dioxolan]-2(1H)-one, M.P. 180–181.5° C. I.R. spectrum exhibited absorption bands at 2.98μ (OH, NH) and 6.13μ (lactam).

*Analysis.*—Calc'd. for $C_{14}H_{23}O_4N$ (percent): C, 62.43; H, 8.61; N, 5.20. Found (percent): C, 62.62; H, 8.76; N, 5.15.

Similarly, dl-cis-3,4,5a,6,7,8,9,9a - octahydro - 7α-hydroxyspiro - 9β - methyl[5H - 1-benzazepino-5,2'-[1,3]-dioxolan]-2(1H)-one and dl-cis-3,4,5a,6,7,8,9,9a-octahydro - 7α - hydroxyspiro-9β-propyl[5H-1-benzazepino-5,2'-[1,3]dioxolan]-2(1H)-one are prepared.

In like manner, the above reaction is repeated in tetrahydrofuran at reflux temperatures for periods of three to twelve hours.

EXAMPLE VII

Nine grams of the hydroxylactam prepared in Example VII are dissolved in 120 ml. of pyridine is dropped into a chromium oxide-pyridine complex, prepared by mixing 8.0 g. of chromium oxide and 120 ml. pyridine below 25° C. The reaction mixture is stirred at room temperature for twenty-four hours. Then the suspension is diluated by chloroform, filtered and then extracted with dilute hydrochloric acid. The dried solution is evaporated to dryness and the solid residue is recrystallized from chloroform-petroleum ether to afford dl-cis-9β-ethyl-3,4,5a,6,9,9a-hexahydrospiro[5H - 1-benzazepino-5,2'(1,3)dioxolane]-2,7-(1H,8H)-dione, 7.6 g., M.P. 220° C. and the I.R. spectrum showed the expected bands at 5.85μ (ketone) and 6.03μ (lactam).

*Analysis.*—Calc'd. for $C_{14}H_{21}O_4N$ (percent): C, 62.90; H, 7.92; N, 5.24. Founr (percent): C, 62.87; H, 8.05; N, 5.18.

Repeating the above precedure, dl-cis-3,4,5a,6,9,9a-hexahydrospiro - 9β - methyl[H-1-benzazepino-5,2'[1,3]-dioxolane] - 2,7 - (1H,8H)-dione and dl-cis-3,4,5a,6,9,9a-hexahydrospiro-9β-propyl[5H-1-benzazepino-5,2' - [1,3]-dioxolane]-2,7(1H,8H)-dione are prepared.

EXAMPLE IX

A solution of 2.6 g. of dl-cis-9β-ethyl-3,4,5a,6,9,9a-hexahydrospiro[5H - 1 - benzazepino - 5,2' - [1,3]dioxolane]-2,7-(1H,8H) dione of Example VIII in 100 ml. of dry dimethylsulfoxide is added to a solution of triphenylphosphonium methylide prepared from dimsyl sodium (1.5 mole equivalent sodium hydride) in 35 ml. of dimethylsulfoxide and 5.4 g. of triphenylmethylphosphonium bromide. After the addition, the mixture is heated to 30–40° C. for a few hours. Then the homogeneous solution is quenched with ice-water (400 ml.) and the precipitated solid is filtered. In this manner, there is obtained dl-cis - 9 - ethyloctahydro-7-methylenespiro[5H-1-benzazepine-5,2'-(1,3)dioxolan]-2(1H)-one which is recrystallized from ethanol, yield 2.14 g. (82 percent); M.P. 196–7° C. The I.R. spectrum exhibits bands at 3.1μ (sharp NH), and 6.03μ (lactam group). N.M.R. spectrum shows a singlet for the four ketal protons at δ 3.97 p.p.m. and a singlet for the two vinylic protons at δ 4.70 p.p.m.

*Analysis.*—Calc'd. for $C_{15}H_{23}O_3N$ (percent) C, 67.89; H, 8.74; N, 5.28. Found (percent): C, 67.60; H, 8.74; N, 5.52.

The above prepared exomethylene lactamketal (2.3 g.) is dissolved in 50 ml. tetrahydrofuran and treated with 9 ml. of one molar equivalent of diborane solution in tetrahydrofuran at 10° C. The colorless mixture is allowed to stand at room temperature overnight and is then decomposed with water, 4 ml. of 10 percent sodium hydroxide and 2 ml. of 50 percent hydrogen peroxide at below 20° C. The reaction mixture is stored for one hour and the excess hydrogen peroxide is decomposed with a palladium-carbon catalyst. The suspension is filtered, diluted with water and the bulk of the solvent evaporated under vacuum. The product is extracted with chloroform, which after evaporation is isolated as a colorless gum in quantitative yield. In this manner, there is obtained dl-cis-9-ethyloctahydro - 7 - hydroxymethylspiro-[5H-1-benzazepine-5,2'-(1,3)dioxolan]-2-(1H)-one whose I.R. spectrum possesses a strong band at 3.0μ for the hydroxyl and NH groups; and a strong band for the lactam's oxo group at 6.05μ.

A solution of 1.7 g. of the above prepared hydroxymethyl lactam in 50 ml. of tetrahydrofuran is slowly dropped into a refluxing solution of 0.5 g. of lithium aluminum hydride in 50 ml. of tetrahydrofuran. Reflux is continued for another sixteen hours. The cooled reaction mixture is diluted with ether (100 ml.) and then carefully decomposed with water. The dried solution is evaporated to dryness and afford dl-cis-9-ethyldecahydrospiro-[5H-1-benzazepine-5,2'-(1,3)dioxolane]-7-methanol as a colorless gum; I.R. spectrum possesses the band for its hydroxyl and NH groups at 3.0μ and the lactam band (at 6.05μ) disappeared.

In the same way, dl-cis-9-methyldecahydrospiro-[5H-1-benzazepine-5,2'-(1,3)dioxolane]-7-methanol and dl-cis-9-propyldecahydrospiro[5H-1-1benzazepine - 5,2' - (1,3)-dioxolane]-7-methanol are synthesized.

EXAMPLE X

Alternative to the sequence of reaction described in Example IX, a dl-cis-9β-ethyl-3,4,5a,6,9,9a-hexahydrospiro[5H - 1 - benzazepino-5,a'-[1,3]dioxolane]-2,7-(1H, 8H)-dione is converted to dl-cis-9-ethyloctahydro-7-methanespiro[5H-1-benzazepine - 5,2' - (1,3)dioxolan]-2(1H)-one by the process of the first paragraph of Example IX. Then four grams of this exomethylene lactamketal in 50 ml. of tetrahydrofuran is dropped into a solution of 1.0 g. of lithium aluminum hydride in 100 ml. of refluxing tetrahydrofuran. Reflux is then continued for another twenty-four hours. The cooled solution is worked up in the usual way resulting in 3.0 g. colorless syrup of dl-cis-9-ethyl-decahydro-7-methylenespiro - [5H - 1 - benzazepine-5,2'-(1,3)-dioxolane] which forms a hygroscopic citrate salt. The N.M.R. spectrum of the free base exhibited a singlet at δ 4.68 p.p.m. for the >C=CH₂ protons and a singlet at δ 3.95 p.p.m. for the four protons of the ketal group.

A solution of 29 g. of the above prepared exomethyleneamine in 75 ml. of ether is treated with 3.6 g. of the trifluoroaceticanhydride at room temperature. The reaction mixture is allowed to stand at ambient temperature for twelve hours. The homogenous solution is then treated with 100 ml. hexane and the separated crystals (2.3 g.) are collected. In this manner, there is obtained dl-cis-9-ethyl-decahydro - 7 - methylene - 1 - trifluoroacetylspiro-[5H-1-benzazepine-5,2'-(1,3)dioxolane], M.P. 145° C. whose I.R. spectrum possesses the expected band at 5.98μ (amide). The N.M.R. spectrum exhibits the chemical shif" for the two vinylic protons at δ 4.78 p.p.m. (singlet) and for the four ketal protons at δ 3.95 p.p.m. (singlet).

*Analysis.*—Calcd. for $C_{17}H_{24}O_3NF_3$ (percent): C, 58.77; H, 6.96. Found (percent): C, 58.69; H, 6.90.

An ice-cold solution of 3.8 g. of the above prepared exomethyleneamide in 50 ml. of tetrahydrofuran is treated with 6 ml. of 1 M diborane solution in tetrahydrofuran. The colorless solution is stored at room temperature for about twelve hours. The excess of diborane is then decomposed with ice-water and the product oxidized with 6 ml. of 10 percent sodium hydroxide and 3 ml. of 50 percent hydrogen peroxide. After the usual work-up 4.0 g. (85.5 percent) of dl-cis-9-ethyldecahydro-1-trifluoroacetylspiro-[5H-1-benzazepine-5,2'-(1,3)dioxolane]-7-methanol is isolated as a colorless foam.

The above prepared trifluoroacetamide derivative is hydrolyzed by admixture with 2 N potassium hydroxide in an ethanol-water (1:1) solvent which is refluxed for twenty-four horus. In this manner, there is obtained dl-cis-9-ethyldecahydrospiro[5H - 1 - benzazepine-5,2'-(1,3)dioxolane]-7-methanol which identical to the compound prepared in Example IX.

Similarly, dl - cis - 9 - methyldecahydrospiro[5H-1-benzazepine - 5,2' - (1,3)dioxolane]-7-methanol and dl-cis-9-propyldecahydrospiro[5H - 1 - benzazepine-5,2'-(1,3)dioxolane]-7-methanol are prepared and are identical to the compounds of the prior example.

EXAMPLE XI

A solution of 11.6 g. of dl-cis-9-ethyldecahydrospiro[5H-1-benzazepine-5,2'-(1,3)dioxolane]-7-methanol, prepared by the procedure of Example IX or X, in 100 ml. of tetrahydrofuran is treated with 50 ml. of 1 N lithium hydroxide. The mixture is then cooled to about 10° C. and 12 g. of carbobenzoxychloride and 80 ml. of 1 N lithium hydroxide are simultaneously added. The pH of the mixture is kept between 10–12; the milky suspension is then stored for an additional hour at 10° C. and then overnight at room temperature. In this manner, there is obtained dl-cis-9-ethyloctahydro - 7 - hydroxymethylspiro-[5H-1-benzazepine - 5,2' - (1,3)dioxolane] - 1 - (2H)-carboxylic acid, benzyl ester as a colorless gum whose I.R. spectrum exhibits bands at 3.0µ (OH) and 6.0µ (strong amide).

In like manner, dl-cis-9-methyldecahydrospiro[5H-1-benzazepine-5,2'-(1,3)dioxolane]-7-methanol and dl-cis-9-propyldecahydrospiro[5H - 1 - benzazepine - 5,2' - (1,3)dioxolane]-7-methanol are respectively converted to dl-cis-7 - hydroxymethylspiro - 9 - methyloctahydro-[5H-1-benzazepine - 5,2' - (1,3)dioxolane] - 1 - (2H)-carboxylic acid, benzyl ester and dl-cis-7-hydroxymethylspiro-9-propyloctahydro-[5H-1-benzazepine - 5,2' - (1,3)dioxolane]-1-(2H) carboxylic acid, benzyl ester.

EXAMPLE XII

A solution of 18.5 g. of dl-cis-9-ethyloctahydro-7-hydroxymethylspiro[5H - 1 - benzazepine - 5,2' - (1,3)dioxolane]-1-(2H)carboxylic acid, benzyl ester in 250 ml. of pyridine is treated with 1.1 mole equivalent tosylchloride at 0° C. The reaction mixture is stored for three days at 6° C. and then evaporated to dryness to afford dl-cis-9-ethyloctahydro - 7 - hydroxymethylspiro[5H - 1 - benzazepine-5,2'-(1,3)dioxolane]-1-(2H)-carboxylic acid, benzyl ester, p-toluenesulfonate.

The above prepared tosyloxy compound is dissolved in ether, washed with ice-cold citric acid solution in water; then dried and evaporated to dryness. The light yellow gum is dissolved in 50 ml. of 8 percent AcOH/HBr and stirred at room temperature for six hours. Upon treatment with 400 ml. of ether an oil separates out which slowly solidifies. The crude product is recrystallized from ethanol-ether to afford dl-cis-9-ethyldecahydro-7-hydroxymethyl-5H-benzazepine-5-one, p-toluenesulfonate, hydrobromide, M.P. 150° C., whose I.R. spectrum possesses the expected bands for the secondary amine salt (3.70µ), ketone (5.88µ) and the sulfonyl group (7.60, 8.40µ).

Analysis.—Calcd. for $C_{20}H_{29}O_4NS \cdot HBr$ (percent): C, 52.13; H, 6.56; N, 3.04. Found (percent): C, 51.85; H, 6.64; N, 3.04.

Similarly, dl-cis-7-hydroxymethyl - 9 - methyldecahydro-5H-benzazepine-5-one, p-toluenesulfonate, hydrobromide and dl-cis-7-hydroxymethyl-9-propyldecahydro-5H - benzazepine-5-one, p-toluenesulfonate, hydrobromide are prepared.

EXAMPLE XIII

One gram of dl-cis-9-ethyldecahydro-7-hydroxymethyl-5H-benzazepine-5-one, p-toluenesulfonate, hydrobromide as prepared in Example XII is admixed with sodium hydroxide and then extracted with methylenechloride. The light yellow base is dissolved in iso-amyl alcohol and refluxed for ten hours. The alcohol is then removed by evaporation and the ether insoluble tosylate salt of the product is obtained. This tosylate salt is dissolved in water, alkalized with diluted sodium hydroxide and extracted with ether. The dried ethereal solution is treated with dry hydrogenbromide gas and the hydrobromide salt of dl-cis - 9 - ethyloctahydro - 1,7 - methano-1H-1-benzazepin-5(4H)-one is collected. The I.R. spectrum of this salt exhibits the amine salt band (4.0µ) and the ketone band (5.89µ). No sulfonyl group absorption is observed.

Similarly, dl-cis-1,7-methano - 9 - methyloctahydro-1H-1-benzazepin - 5(4H)-one and dl-cis-1,7-methano-9-propyloctahydro-1H-1-benzazepin - 5(4H)-one are prepared.

EXAMPLE XIV

The dl-cis - 9 - ethyloctahydro - 1,7 - methano-1H-1-benzazepin-5(4H)-one of Example XIII (0.8 g.) is dissolved in 60 ml. of 10 percent sulfuric acid and is treated with 0.3 ml. of phenyl-hydrazine. The reaction mixture is heated on a steam bath for one hour. The light colored reaction mixture is cooled and alkalized with cold ammonium hydroxide. Ibogamine separates out as a tan colored gum, which is twice recrystallized from methanol, M.P. 128–230° C. U.V. spectrum possesses the characteristic indole absorption at $\lambda_{max.}$ 228, 283, and 291 mµ.

Mass spectrum contained the expected molecular-ion peak at m/e 280. The fragment ion peaks, observed by K. Biemann and M. Friedmann-Spiteller (J.A.C.S. 83, 4805, 1961) for the naturally occurring ibogamine were also observed in the spectrum of the synthetic ibogamine.

Analysis.—Calcd. for $C_{19}H_{24}N_2$ (percent): C, 81.38; H, 8.63; N, 9.99. Found (percent): C, 81.10; H, 8.61; N, 9.90.

EXAMPLE XV

Repeating the procedure of Example XIV to react a dl-cis-9-lower alkyloctahydro - 1,7 - methano - 1H-1-benzazepin-5(4H) with an appropriate phenylhydrazine, compounds of the following structural formula are prepared:

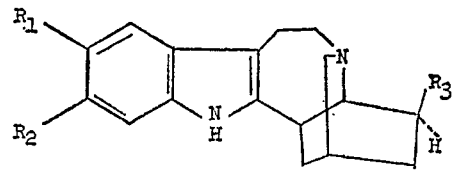

where $R_1$, $R_2$ and $R_3$ are defined as:

| $R_1$ | $R_2$ | $R_3$ |
| --- | --- | --- |
| Amino | Hydrogen | Ethyl |
| Do | do | Methyl |
| Cyano | do | Ethyl |
| Hydrogen | Ethylamino | Methyl |
| Dimethylamino | Hydrogen | Ethyl |
| Hydrogen | do | Propyl |
| Do | Hydroxy | Methyl |
| Benzyliamo | Hydrogen | Ethyl |
| Hydrogen | Bromo | Methyl |
| Chloro | Hydrogen | Ethyl |
| Hydrogen | Diethylamino | Methyl |
| Carboxy | Hydrogen | Butyl |
| Ethylamino | do | Ethyl |
| Fluoro | do | Methyl |
| Hydrogen | Carboxy | Ethyl |

What is claimed is:
1. A compound selected from the group consisting of those having the formula:

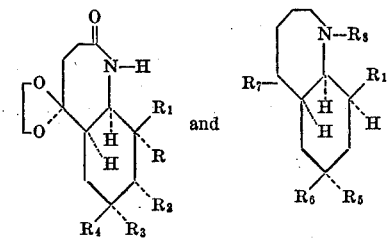

wherein $R_1$ is lower alkyl; $R_2$ when taken separately is hydrogen; $R_3$ when taken separately is selected from the group consisting of hydrogen and hydroxy; and when $R_2$ and $R_3$ are taken together form an epoxy group; $R_4$ when taken separately is selected from the group consisting of hydrogen and hydroxymethyl and when $R_3$ and $R_4$ are taken together with the carbon atom to which they are attached from a moiety selected from the group consisting of ethylidene and carbonyl; $R_5$ when taken separately is hydrogen; $R_6$ is selected from the group consisting of hydroxymethyl, and tosyloxymethyl when $R_5$ and $R_6$ are taken together with the carbon atom to which they are attached from an ethylidene group; $R_7$ when taken together with the carbon atom to which it is attached is selected from the group consisting of carbonyl and a 1,3-dioxane; $R_8$ is selected from the group consisting of hydrogen, trifluoroacetyl and carbobenzoxy with the proviso that when $R_7$ is carbonyl $R_5$ and $R_8$ are hydrogen and $R_6$ is tosyloxymethyl and with the further proviso that when $R_6$ and $R_5$ are taken together $R_8$ is selected from the group consisting of hydrogen and trifluoroacetyl.

2. A compounds as described in claim 1 which is: dl-cis - 7α,8α-epoxy-9β-ethyl-3,4,5a,6,7,8,9,9a-octahydrospiro - [5H-1-benzazepino - 5,2'-(1,3)dioxolan]-2(1H)-one.

3. A compound as described in claim 1 which is: dl-cis - 9β-ethyl - 3,4,5a,6,7,8,9,9a-octahydro-7α-hydroxyspiro[5H - 1-benzazepino - 5,2'-(1,3)dioxolan]-2(1H)-one.

4. A compound as described in claim 1 which is: dl-cis - 9β-ethyl - 3,4,5a,6,9,9a-hexahydrospiro[5H-1-benzazepino-5,2'-(1,3)dioxolane]-2,7-(1H,8H)-dione.

5. A compound as described in claim 1 which is: dl-cis - 9β - ethyloctahydro-7-methylenespiro[5H-1-benzazepine-5,2'-(1,3)-dioxolan]-2(1H)-one.

6. A compound as described in claim 1 which is: dl-cis - 9β - ethyloctahydro-7-hydroxymethylspiro[5H-1-benzazepine-5,2'-(1,3)dioxolan]-2-(1H)-one.

7. A compound as described in claim 1 where is: dl-cis - 9β-ethyldecahydrospiro - [5H-1-benzazepine-5,2'-(1,3)dioxolane]-7-methanol.

8. A compound as described in claim 1 which is: dl-cis - 9β - ethyldecahydro-7-methylenespiro[5H-1-benzazepine-5,2'-(1,3)-dioxolane].

9. A compound as described in claim 1 which is: dl-cis - 9β- ethyldecahydro-7-methylene-1-trifluoroacetylspiro-[5H-1-benzazepine-5,2'-(1,3)dioxolane].

10. A compound as described in claim 1 which is: dl-cis - 9β - ethyldecahydro-1-trifluoroacetylspiro-[5H-1-benzazepine-5,2'-(1,3)dioxolane]-7-methanol.

11. A compound as described in claim 1 which is: dl-cis - 9β - ethyloctahydro-7-hydroxymethylspiro-[5H-1-benzazepine - 5,2'-(1,3)dioxolane]-1-(2H) - carboxylic acid, benzyl ester.

12. A compound as described in claim 1 which is: dl-cis - 9β - ethyloctahydro-7-hydroxymethylspiro-[5H-1- benzazepine - 5,2'-(1,3)dioxolane] - 1-(2H)-carboxylic acid, benzyl ester, p-toluenesulfonate.

13. A compound as described in claim 1 which is: dl-cis - 9β - ethyldecahydro-7-hydroxymethyl-5H-benzazepine-5-one, p-toluenesulfonate, hydrobromide.

14. A process for the preparation of a compound having the formula:

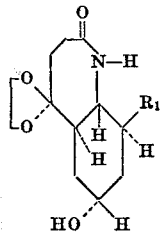

wherein R is lower alkyl which comprises contacting a compound of the formula

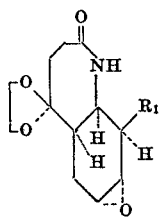

wherein R is defined as above, with lithium aluminum hydride in a reaction-inert organic solvent at reflux temperatures for a period of about three to about twelve hours.

15. A process as described in claim 14 wherein the reaction-inert organic solvent is ether.

16. A process as described in claim 14 wherein the reaction-inert organic solvent is tetrahydrofuran.

17. A process for the preparation of a compound having the formula:

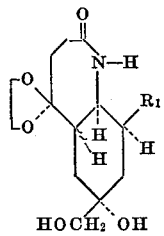

wherein $R_1$ is defined as lower alkyl which comprises:
(a) contacting a compound of the formula:

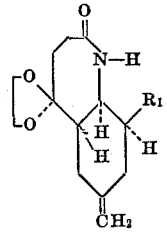

wherein $R_1$ is defined as above, with about one molar equivalent of diborane in an unreactive organic solvent at a temperature range from about 0° C. to about 25° C. for a period of about one to about sixteen hours; and then
(b) oxidizing the resulting mixture by contact with an alkali metal hydroxide and hydrogen peroxide.

18. A process as described in claim 17 wherein the unreactive organic solvent is tetrahydrofuran, and the alkali metal hydroxide is sodium hydroxide.

References Cited

UNITED STATES PATENTS 3,294,817  12/1966  Sallay _____ 260—340.9

FOREIGN PATENTS 910,428  11/1962  Great Britain.

OTHER REFERENCES

Von Braun, "Chem Berichte," vol. 40, pp. 1834–1846 (1907).

HENRY R. JILES, Primary Examiner

R. T. BOND, Assistant Examiner

U.S. Cl. X.R.

424—274, 244; 260—239.3, 340.7, 340.9, 293, 294.7